Nov. 9, 1965   H. J. ALTER ETAL   3,216,673
WINGED HULL VEHICLE
Filed June 6, 1963   4 Sheets-Sheet 4
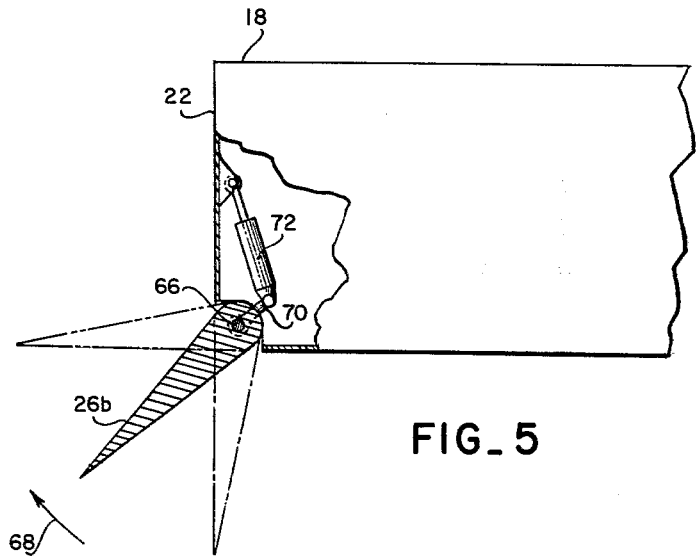
FIG_5
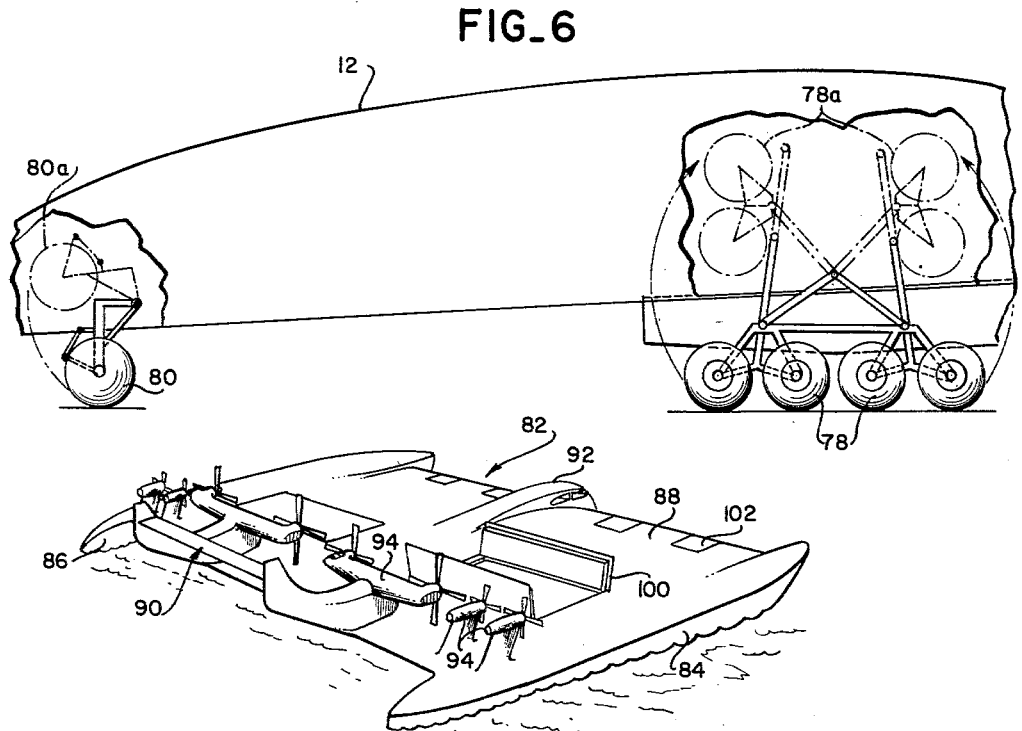
FIG_6
FIG_7
INVENTORS
HORACE J. ALTER
VSEVOLD B. KORIAGIN
Agent

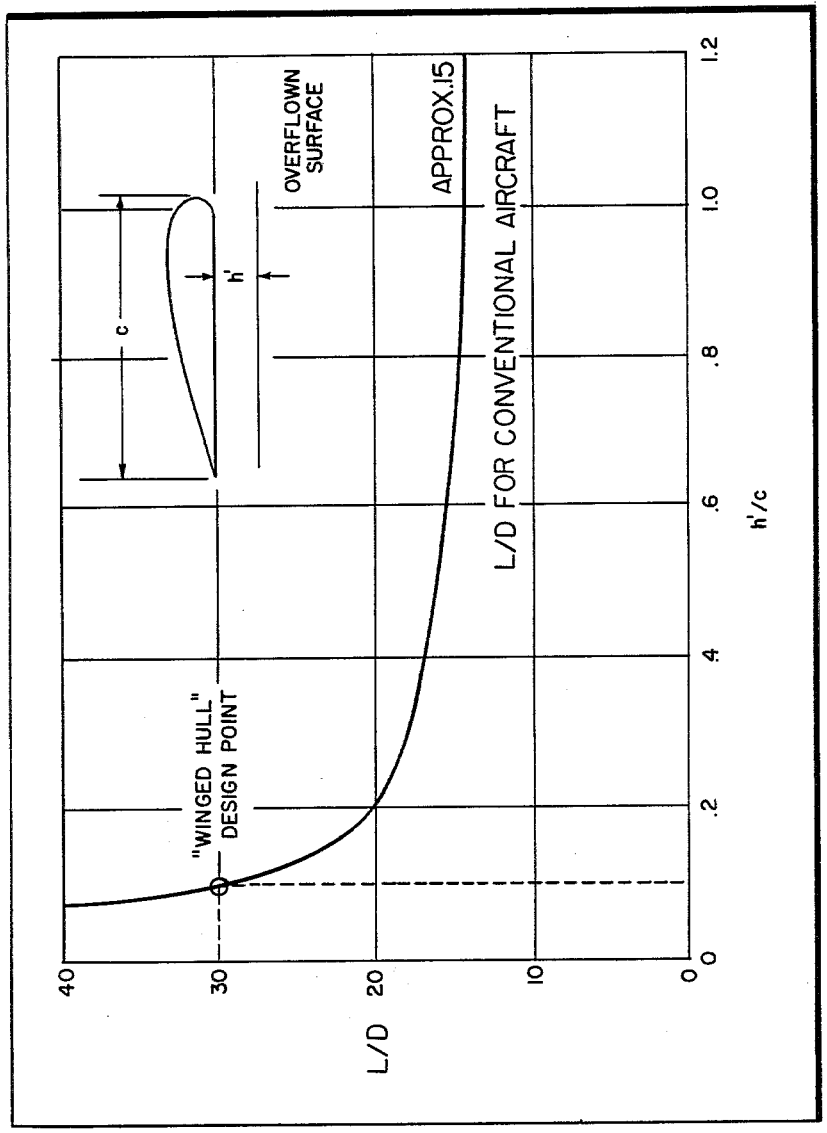
FIG_1

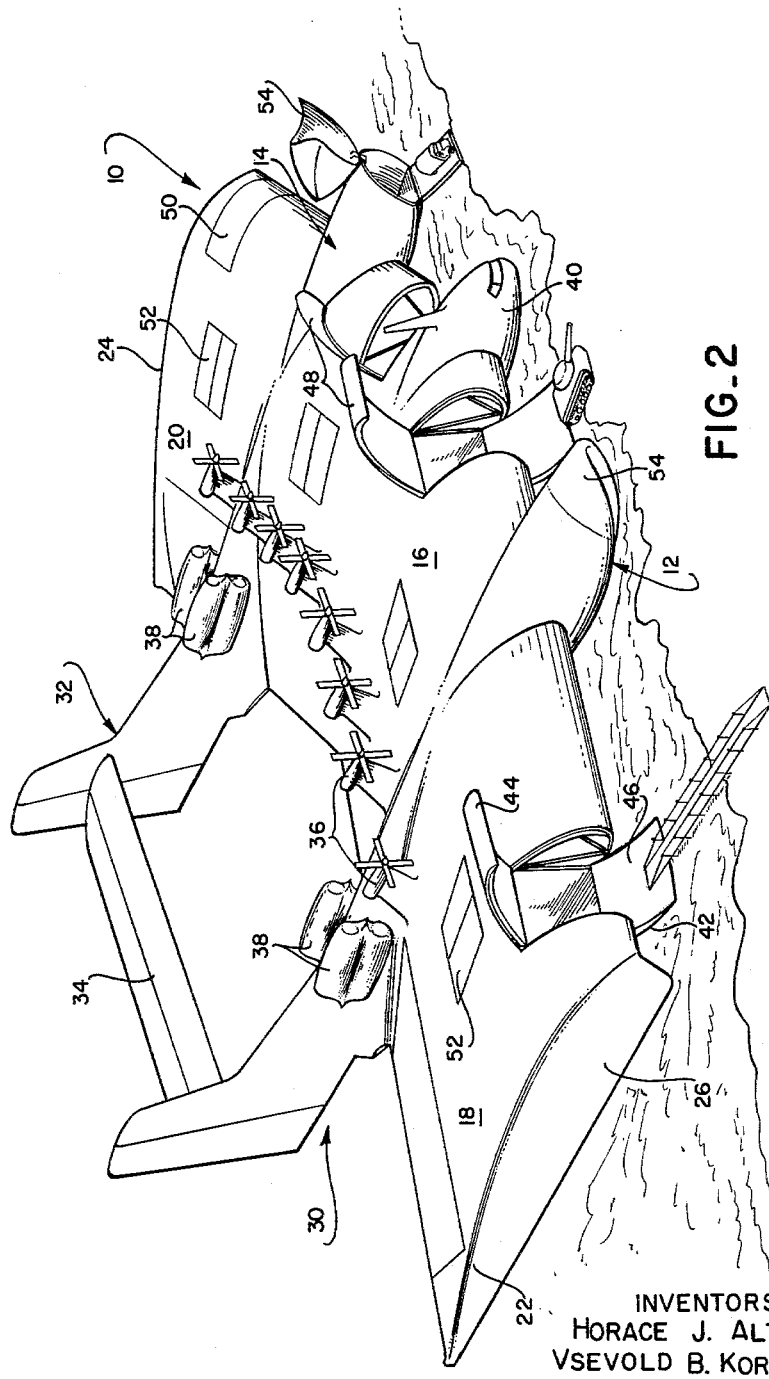

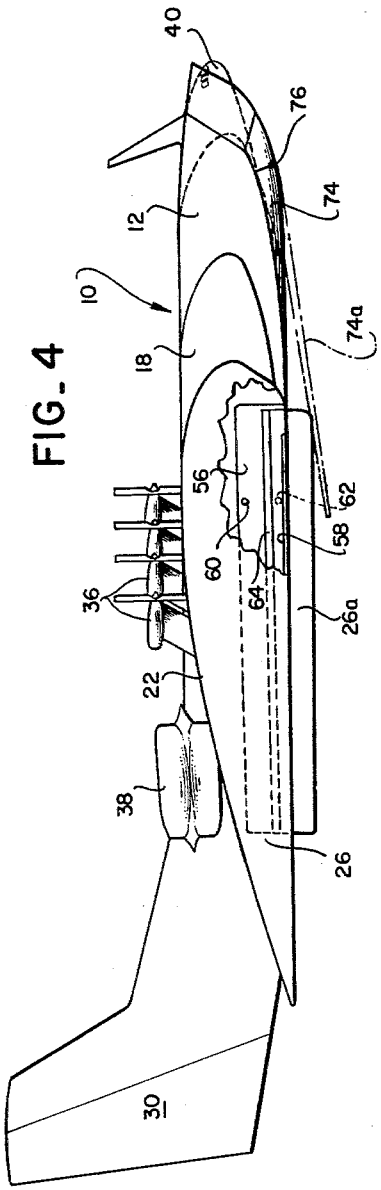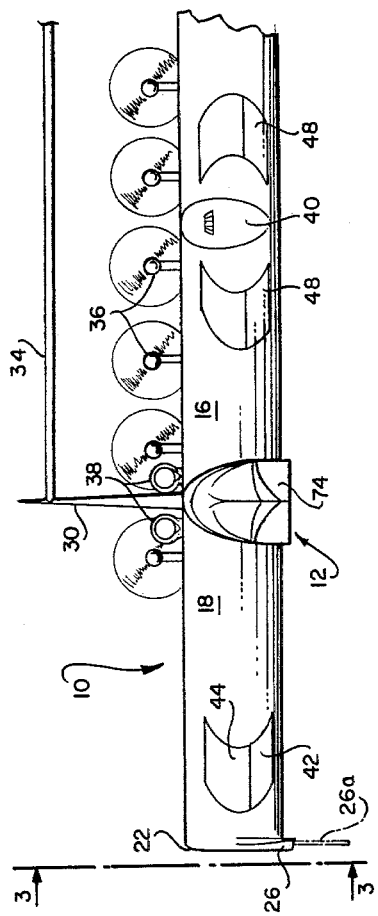

United States Patent Office 3,216,673
Patented Nov. 9, 1965

3,216,673
WINGED HULL VEHICLE
Horace J. Alter, Del Mar, and Vsevolod B. Koriagin, Glendale, Calif., assignors to Lockheed Aircraft Corporation, Burbank, Calif.
Filed June 6, 1963, Ser. No. 286,116
3 Claims. (Cl. 244—12)

This invention pertains to a winged vehicle adapted for flying in close proximity over water or land to take maximum advantage of the aerodynamic efficiency resulting from the ground effect between the vehicle wing and the surface over which it moves.

More particularly, the invention relates to an airborne vehicle which has a low aspect ratio wing and air barriers on its wing tips whereby the design characteristics thereof capture the advantages of ground effects in providing a carrier with greatly enhanced operational capabilities. This vehicle utilizes in a unique manner certain characteristics of the "Aero-Glide Boat" which is the subject of patent application Serial No. 42,429, directed to a boat which is partially airborne during operation but which never becomes entirely airborne. The vehicle of the present invention (sometimes referred to as a "winged hull vehicle") is a true aircraft which, during full operation is out of surface contact.

To a very limited extent all aircraft must fly in ground effect to take off and land, but little or no benefit from such ground effect can be gained during these maneuvers by aircraft of the prior art. Such aircraft generally utilize wings having relatively high aspect ratios in obtaining the greatest lift efficiency at altitudes wherein the wings are not operating in ground effect. While high aspect ratio wings are efficient for their intended functions, it is a requirement that relatively great speed and power be provided to maintain their airborne condition. These wings are also relatively thin in cross-section. The result is a vehicle having high speed characteristics, but in which the wing interiors cannot be used to advantage as a carrier compartment.

The use of conventional land and water vehicles such as ships and trucks which are not capable of being airborne results in a capability of transporting great cargo tonnages or numerous passengers. However, the speed with which such cargos or passengers may be transported is materially limited by the inherent characteristics of the transport vehicles.

Through the utilization of the vehicle of the present invention a capability for carrying cargo and passengers in amounts heretofore unknown in airborne vehicles and at a speed greatly in excess of those of which surface vehicles are capable is provided.

Therefore, a major object of the present invention is to provide a new airborne vehicle having greatly increased cargo and passenger carrying capacity.

Another object of invention is to provide a new and novel vehicle which is relatively inexpensive to operate resultant from its movement over bodies of land and water in close proximity thereto and which is capable of operation as an amphibious tanker for rapid and mobile operation movements.

A still further object is to provide an amphibious airborne vehicle which exploits the advantage of speed in conjunction with a high weight carrying capacity, a shallow draft hull providing take-off and cargo handling capabilities in extremely shallow water regions.

Yet another object of the invention is to provide an airborne vehicle having a low aspect ratio wing including provision therein for cargo storage and access means in its wings for loading and unloading cargo.

Still another object is to provide an airborne vehicle capable of utilizing ground effects as enhanced by the existence of air barriers upon its wing tips in obtaining an effective transport efficiency.

Other objects of the invention will become apparent from the specification when read in light of the accompanying drawings, in which:

FIGURE 1 is a graph plotting lift/drag ratio against wing clearance/chord length;

FIGURE 2 is a perspective view of a preferred embodiment of the vehicle of this invention;

FIGURE 3 is a front elevational view of the vehicle of FIGURE 2.

FIGURE 4 is a side elevational view in partial cutaway of an air barrier of the invention as taken along lines 3—3 of FIGURE 3;

FIGURE 5 is a view similar of FIGURE 4 partially cutaway to illustrate in semi-schematic form an alternative embodiment of the air barrier;

FIGURE 6 is a schematic representation of a landing gear system applied to the vehicle; and FIGURE 7 is a perspective view of a second embodiment of the vehicle of this invention.

The winger hull vehicle of this invention generally comprises at least one hull member having wing means extending therefrom, the wing means being of low aspect ratio, and means definining air barriers extending downward from the tips of the wing means.

In its amphibious configuration the vehicle is basically a flying wing with pontoons. It is particularly suited to fill a transportation gap with respect to presently existing transport vehicles. As noted above, when compared to large water displacement ships, although the load carrying capacity is not as great, the speed of delivery is greatly multiplied.

Conversely, with respect to conventional aircraft, while the speed of the present vehicle is lesser, the cargo carrying capacity may be increased many times over. The vehicle, therefore, occupies a significant and unique position in the transportation spectrum in closing an otherwise vacant area. This capability is achieved by increasing aerodynamic lift and reducing resistance or drag through taking advantage of ground effects. The latter phenomenon is produced during vehicle operation to raise the vehicle above the surface of the water as speed is increased, thereby eliminating the hydrodynamic drag experienced by displacement ships. As related to the present concept, the ground effect phenomenon results when the aerodynamic wing member is moved with a positive angle-of-attack over an adjacently spaced surface, the air interposed therebetween being compressed in a venturi-like manner between the under surface of the wing and the over-flown surface. This compressed air is prevented from escaping by the air barriers positioned on the wing tips. The resulting increase in air pressure beneath the wing acts as a dynamic force to support the vehicle. Hence, when operating in ground effect just above the air/water interface the vehicle realizes a lift/drag ($L/D$) ratio which is higher than can be obtained by a conventional aircraft flying at altitude. Although the basic theory of an aerodynamic lifting surface operating in ground effect has long been known, the advantages with regard to $L/D$ and low specific power have never been fully utilized heretofore. The present vehicle is designed to exploit this phenomenon.

The air barriers extending downward from the wing tips during out of ground effect operation reduces the induced drag of the wing. This affects the wing as if the wing span had been increased. Extending the barriers into immediate adjacency with the water surface further magnifies the effective increase in wing span. In so doing, the effective aspect ratio of the wing is greatly increased over that of a wing with air barriers but operating away from the water surface, i.e., out of ground effect. The low aspect ratio wing used with the present vehicle then has the aerodynamic efficiency of a much greater wing span than actually exists.

The air barriers also prevent movement of air outward past the wing tips and the formation of wing tip vortices within the air-captured region above the lower extremity of the air barrier, i.e., the tendency of the air at higher pressure below the wing to spill upwardly over the wing tip to the lower pressure upper surface. This permits a more efficient utilization of the ground effect phenomenon.

The shape of the $L/D$ versus $h/c$ (wing clearance height divided by chord length) curve is of significance in understanding the theory and operation of the present invention. A curve for a typical vehicle is illustrated in FIGURE 1. It will be noted that the $L/D$ curve is very steep at the design point indicated for the winged hull vehicle. Analysis conducted with respect to this vehicle indicates that an $L/D$ of 30 or above can be realized; thus, a transport efficiency can be obtained which is approximately twice that obtainable by modern aircraft flying at cruise altitudes, the usual $L/D$ of the latter aircraft being about 18. In obtaining an $L/D$ of 30 the wing is operated at relatively low clearance heights above a surface, e.g., a few feet. A marked increase in range is realized when low flight altitudes are maintained, thereby increasing operational efficiency. A practical design is provided by an $h/c$ of approximately 0.10 for this size of vehicle.

The steepness of the curve at this design point also creates another theoretically important feature; an inherent "altitude-hold" characteristic. If the vehicle tends to sink below the design point during a steady cruise condition the $h/c$ decreases and a rapid increase in lift is realized. If the vehicle tends to rise above the design point, a decrease in lift materializes, with a resultant decrease in altitude. Thus, at a given weight and power setting, the vehicle can be trimmed such that a specific angle-of-attack and air speed results, and the vehicle continues to seek this altitude, attitude, and speed. By the same reasoning, the vehicle also has an inherent stability in roll.

Although the winged hull vehicle is designed for best performance in ground effect flight, flight at altitude is possible with a penalty in range due to the resultant drop in $L/D$ ratio. Hence, over-flying low coastal land masses for access to adjacent airports or runways can be achieved. Utilization of the air barriers increases the aerodynamic efficiency of the airfoil section to a small extent even though it may be out of ground effect.

The vehicle of this invention in its preferred embodiment, as illustrated in detail in FIGURES 2–4, is generally identified by the numeral 10. A pair of hulls or pontoons 12 and 14 (usually referred to as pontoons hereinafter) are normally constructed such that the draft thereof is extremely shallow. Due to this shallow draft, the ease in beaching the vehicle creates a mobile and rapid source of material or personnel resupply with trans-oceanic transfer capability. The anchoring of the vessel in shoal waters is also thereby facilitated. A typical shallow draft pontoon is illustrated in the figures.

Extending between and affixed to the pontoons 12 and 14 is a central wing section 16. Attached to the pontoons 12 and 14, respectively, and extending outwardly therefrom is a pair of outboard wing sections 18 and 20 having tips 22 and 24, respectively, on the outer extremites thereof. Each of the wing tips 22, 24 includes an air barrier member 26 extending downward therefrom.

Attached to and extending rearwardly from the respective pontoons are empennage assemblies 30 and 32 which include conventional empennage components, a horizontal stabilizer assembly 34 being connected therebetween.

Power means is provided by a series of conventional aircraft power plants 36 of the propeller type and/or a plurality of jet type power plants 38, as opposed to water-contacting power sources. Other power plant means may be substituted without departing from the intent or scope of the invention.

For purposes of illustration a crew compartment 40 is shown centrally of the central wing section 16.

In its preferred embodiment, the vehicle is provided with a plurality of cargo hatches in the leading edges of its wings. For example, a hatch comprising lower and upper sections 42 and 44, respectively, is provided in the leading edge of the outboard wing section 18. Either integral with or structurally separate from the lower hatch section 42, dependent upon the specific design function to be accomplished, a ramp 46 is provided. This ramp is extendable from the hatch to provide a means for ingress to and egress from the wing interior for cargo handling purposes. Similar hatches 48 and 50 are provided in the other wing sections. Additional hatches, as typically illustrated by numerals 52, may be provided either in the upper or lower wing surfaces. The noses of the pontoons 12 and 14 may also be adapted for cargo loading and unloading as illustrated by the hatches of numerals 54.

The vehicle is provided with cargo space vastly in excess of available space in conventional aircraft resultant from the low aspect ratio characteristics of the wing and the resulting ability to increase the wing thickness. The space thereby provided may be utilized for either cargo or passenger carrying, as may also the space within the pontoons. The vehicle may be considered as virtually a flying wing with the addition of control means and landing means. The basic structure is sometimes referred to as a composite hull/wing structure.

In its simplest form the geometric aspect ratio of a particularly airfoil is calculated from the formula $$AR = \frac{b}{c}$$

where;

$AR$ = aspect ratio
$b$ = wing span, and
$c$ = wing chord

The geometric aspect ratio of the present vehicle, as compared to that of a conventional long-range cargo aircraft is very low. For example, the aspect ratio of a typical wing of the present invention is $AR=2$; whereas, that of conventional aircraft is usually $AR=8$. An example of a particular low aspect ratio wing for a vehicle of this invention has a wing span of 371 feet and a chord of 187 feet; and, therefore, an aspect ratio of 1.98.

The low aspect ratio of the present vehicle, when compared to the aspect ratio of the wing of a typical, long-range cargo aircraft, results in a lower wing weight and higher bending and torsional rigidity for equivalent loading, stress level and wing thickness ratios. Since bending moment resistance material represents a large portion of the wing weight, it can be shown by the following derivation that a four-fold increase in weight ratio of materials is required to resist the bending moments of an $AR=8$ wing as compared to an $AR=2$ wing.

For wings of equal area and equivalent loading the ratio of spans for an $AR=8$ and $AR=2$ wing is 4/2 respectively, or a wing span ratio of 2/1. Since bending moment is proportional to the wing span, the moments will be in the same ratio. The wing chords are in inverse proportion, i.e., the chord of $AR=8$ wing is ½ that of the $AR=2$ and the resultant thicknesses of the wings are in the same proportion, or a root chord thickness ratio of ½. Therefore, the structural wing-to-fuselage couple resisting the bending moment for the $AR=8$ wing is one-half that of the $AR=2$ wing. It is seen that with twice the bending moment and one-half the resisting couple the resultant loads on the material are four times as great for the $AR=8$ wing. Hence, a four-fold increase in materials is required to maintain the same stress level inherent in the $AR=2$ wing. The equation may be written as follows:

$$\frac{\text{Wing span ratio}}{\text{Root chord thickness ratio}} = \frac{2/1}{1/2} = 4$$

The wing shear material and secondary structural weight are substantially unaffected by aspect ratio.

The ratio of deflection at the wing tip due to bending $$\frac{(\text{Wing span ratio})^2}{\text{Root chord thickness ratio}} = \frac{(2)^2}{1/2} = 8$$

or eight times greater for the high aspect ratio wing of conventional aircraft than for the low aspect ratio wing of the present invention. Conversely, the $AR=2$ wing is eight times stiffer in bending.

The ratio of wing tip deflection due to torsion, based on the general expression for overall torsional stiffness of the wing box of the present invention is:

(Wing chord ratio times wing thickness ratio) i.e., $$(2 \times 2)^2 = 16$$

Therefore, the $AR=2$ wing is 16 times more rigid in torsion than is the $AR=8$ wing.

These significant increases in bending and torsional stiffness due to the low aspect ratio tend to alleviate any problems which would otherwise result from air barrier clearance over the water and aeroelastic effects, as well as producing a structure which is vastly lighter in weight. There is, of course, a resulting comparable increase in cargo carrying capacity.

Dependent upon the nature of the cargo, a heavy cargo floor is sometimes provided as an integral part of the basic wing and pontoon structure.

The wing of the present vehicle, in addition to including a low aspect ratio, is preferably designed with a constant chord and a constant thickness to minimize manufacturing and tooling costs and to provide interchangeability of numerous parts. It is usually swept rearward at a moderate angle, in substantially the manner illustrated in FIGURE 2, for reasons of center of gravity and stability control.

Although fixed structure is suitable for some vehicle configurations, the air barriers or end plates of this invention are preferably of an adjustable character. Alternatively, combinations of fixed and adjustable barriers are used. For example, the end plate 26 of FIGURE 3 extends downward from the wing tip 22 a relatively short distance. However, an extension 26a, which is normally retracted within the wing tip, may be adjustably extended to any position downward therefrom to the maximum extension position illustrated in FIGURE 3. The extension 26a is shown in partially retracted position in FIGURE 4, the wing tip 22 being partially cutaway to better illustrate a representative mechanism thereof. The wing tip 22 includes a recess 56 having a stop member 58 on its lower extremity and a pair of pressure ports 60 and 62 entering the recess. A flange or actuating member 64 is attached to the upper extremity of the extension 26a such that the introduction or bleed of pressurized gases into the cavity 56 either above or below the flange 64 will cause the extension member 26a to be either extended or retracted. Conventional pressure and control means (not shown) are provided to control the vertical positioning of the extension member.

It is sometimes desirable to utilize a hinged member rather than the described vertically adjustable member as an air barrier. This alternative embodiment is illustrated semi-schematically in FIGURE 5. The hinged air barrier 26b is conventionally hinged at position 66 to be swung outward and upward in the direction of arrow 68. It may be stopped at any intermediate position (see the dotted line positions) dependent upon the distance below the lower wing surface to which it is desired to extend. A conventional crank 70 and hydraulic actuating piston 72 may be affixed between the hinged barrier 26b and wing structure to facilitate barrier actuation. The barrier 26b may also be hinged to move in the opposite inboard direction about the hinge 66 if desired, dependent upon design conditions to be met.

It is generally preferable that the lower extremity of the fixed air barrier 26, or the extension member operable in conjunction therewith, be positioned immediately above the water level when the winged hull vehicle is in a static position in the water. It is also desirable that during landing and take-off procedures the air barrier be maintained in relatively close proximity above the water level. This provides an optimum result from ground effect. During take-off, as the vehicle gradually rises above the water level the air barrier is extended to maintain the most efficient ground effects conditions by providing a larger air-captive and retention region. The extension is continued until an optimum $L/D$ for a given height is attained. In general, it is desirable during all phases of operation that the lower extremity of the air barrier be maintained as close to the water surface as possible while still maintaining practical clearance above waves, etc., thereby precluding the possibility of wave strikes against the barriers. When the gap between the air barrier and the water surface increases the result is a decrease in lift and $L/D$. However, this condition is subject to variation dependent upon the particular characteristic of the vehicle. The maximum gap allowable is conditioned upon various design factors. The relationship of the wing height at its trailing edge $(h')$ and the gap between the barrier and the over-flown surface $(h)$ provides a relationship from which an optimum $L/D$ may be obtained. Maximum effectiveness in ground effect operation is obtained at extremely low altitude when $h/c$ is slightly less than approximately .10, the minimum gap being present when the lower tip of the barrier just clears the over-flown surface. The minimum wing height $(h')$ is limited by the barrier, i.e., sufficient wing height to permit the barrier to clear the surface. Conversely, when $h/c$ is approximately .25 or above it may be stated that the maximum effective wing height has been exceeded and the wing is essentially out of ground effect. The efficiency of the wing is then reduced as indicated by a loss of $L/D$.

It should be understood that the angle-of-attack of the wing should be positive at all times during ground effect operation of the vehicle. Generally, a large vehicle will permit a larger gap than does a small vehicle. The gap $(h)$ in obtaining optimum flight conditions is approximately .05 to .07 of the wing chord during normal cruise flight. This is variable to some extent dependent upon specific design factors and the sea state conditions. For example, a rough sea surface normally requires an increase in gap of the air barrier-to-mean sea surface level in achieving optimum flight characteristics. In general, a height range of .02 to .10 of the wing chord is acceptable in maintaining a reasonably effective ground effect while still maintaining practical clearances below the barrier.

In order that the hydrodynamics of the vehicle may be enhanced for ease of landing and take-off from water, a retractable ski is provided upon each pontoon 12 and 14. Such a ski is illustrated in a stowed position in FIGURES 3 and 4 by the numeral 74. While stowed, the ski is aerodynamically flush within the lower portion of the pontoon. A hinge 76 is provided whereby the ski 74 may be extended into the alternate position 74a. Conventional hydraulic actuating means (not shown) may be provided for this purpose. When the ski is extended, hydraulic dampening in the shock absorber type extending strut will minimize accelerations caused by wave impact encountered during take-off and landing procedures. They also permit the attainment of the required angle-of-attack for take-off. It is generally desirable that the centroid of the well-known triangular ski step be immediately beneath the center of gravity of the vehicle for most effective operation. The ski while extended provides a step which is the equivalent of a conventional seaplane step.

In order that the vehicle may be capable of truly amphibious operation, landing gears of a substantially conventional character may be attached to the pontoons for retraction therein. A typical construction is illustrated semi-schematically in FIGURE 6 wherein the pontoon 12 has a quadricycle type forward landing gear system 78 illustrated in the extended position. The stowed position is illustrated by the dotted lines 78a. Additionally, a rear landing gear 80 is provided upon each pontoon, its stowed position being illustrated at 80a. Obviously, this landing gear system is representative only and is not to be taken as limiting to the character or scope of the invention.

The alternative embodiment of the invention illustrated in FIGURE 7 is basically similar to the FIGURE 2 embodiment. However, the outer wing panels are not utilized and the pontoons act as air barriers. In brief detail, the vehicle 82 includes a pair of hulls or pontoons 84 and 86, a low aspect ratio wing 88, a dual empennage assembly 90, and a crew compartment 92. Suitable fixed propulsion units 94 are provided.

Cargo hatches 100 and 102 are provided similar to those in the vehicle 10.

Adjustable air barriers may be provided in conjunction with the pontoons 84 and 86 in substantially the same manner as heretofore described with respect to FIGURES 2–5.

Operationally, as explained with respect to the FIGURE 2 embodiment, when the vehicle is resting in the water preparatory to take-off, the air barriers are in relative positions with respect to the water-line as explained above. As the power plants 36 and 38 are actuated to begin the take-off run, the skis 74 are moved downward from their retracted positions so as to lift the vehicle above the water surface in a water planing condition as its speed increases. This assists in breaking the water tension. Simultaneously, as the vehicle begins to rise, the extendable air barriers 26a are actuated downward to maintain the most efficient clearance relationship possible with respect to the water surface in its existing wave condition, thereby maintaining the maximum ground effect action on the wing, the $L/D$ ratio, and effectively increasing the lifting capabilities. Once the vehicle structure, with the exception of the skis, has escaped water contact, and the forward speed of the vehicle is sufficient to sustain flight, the skis 74 are retracted into an aerodynamically smooth relationship within the pontoons. At this time the vehicle is fully sustained out of water contact by the aerodynamic lift of its wing members, the ground effect achieved in close proximity flight, whereby aerodynamic forces not otherwise available are applied to the under surfaces of the wings, assisting in materially increasing operational efficiency.

In maintaining the greatest operational efficiency the vehicle continues to fly a specified altitude above the water surface which is the most efficient operational altitude for the vehicle of the particular design characteristic, the most efficient operation generally being achieved by maintaining vehicle flight at the lowest altitude possible without encountering wave interference. In the event that the vehicle rises to an altitude wherein the ground effect thereof is lost, a decrease in overall operational efficiency results.

During landing procedures the sequence of events explained above with respect to take-off are substantially reversed.

Obviously, when the vehicle is operated from a land base the skis 74 remain inoperable in their stowed positions and the landing gears are extended and retracted in the conventional manner for landing and take-off procedures. The procedure with respect to the air barriers remains the same whether the vehicle is operating over land or water. It should be noted that the vehicle as configured possesses STOL capabilities (Short Take-Off and Landing). This results from the increased lift in ground effect operation which permits airborne sustenance at lower than normal speeds.

While the specific embodiments of the invention have been shown and described herein it should be understood that certain alterations, modifications and substitutions may be made to the instant disclosure without departing from the spirit or scope of the invention as defined by the appended claims.

We claim:
1. A winged hull vehicle comprising:
 (a) a pair of hulls, said hulls including:
  (1) means for accommodating landing of said vehicle, and
  (2) skids normally mounted flush within said hulls, said skids being extendable to provide a water planing surface and surface tension break means for said vehicle;
 (b) a low aspect ratio wing having:
  (1) a relatively thick cross-section adapted to accommodate a large payload,
  (2) a portion of said wing connected between said hulls,
  (3) portions of said wing fixed to and extending outward from said hulls, and
  (4) including wing tips at the extremities thereof;
 (c) an air barrier attached to and extending downward from each said wing tip, actuating means associated with each said air barrier to facilitate barrier movement with respect to said wing tip to which it is attached;
 (d) aerodynamic control means connected to said wing; and
 (e) power means connected to said vehicle to propel same.

2. A winged hull vehicle comprising:
 (a) a pair of hulls, said hulls including:
  means for accommodating landing of said vehicle, and
  skids normally mounted flush within said hulls, said skids being extendable to provide a water planing surface and surface tension break means for said vehicle;
 (b) a wing having an aspect ratio of less than 4 and including:
  a relatively thick cross-section adapted to accommodate a large payload,
  a portion of said wing connected between said hulls,
  portions of said wing fixed to and extending outward from said hulls, and
  including wing tips at the extremities thereof;
 (c) an air barrier hinged to and extending downward from each said wing tip, actuating means coupled to the wing and the air barrier for pivoting the barrier relative to the wing;
 (d) aerodynamic control means connected to said wing; and
 (e) power means connected to said vehicle to propel same.

3. A winged hull vehicle comprising:
 (a) a pair of hulls, said hulls including:
  means for accommodating landing of said vehicle, and
  skids normally mounted flush within said hulls, said skids being extendable to provide a water planing surface and surface tension break means for said vehicle;
 (b) a wing having an aspect ratio of approximately 2 and having:
  a relatively thick cross-section adapted to accommodate a large payload,
  a portion of said wing connected between said hulls, portions of said wing fixed to and extending outward from said hulls, and including wing tips at the extremities thereof;

(c) an air barrier attached to and extending downward and substantially parallel to a bottom surface of the wing, actuating means associated with each said air barrier for moving the air barrier at substantially right angles to the length of the wing;

(d) aerodynamic control means connected to said wing; and (e) power means connected to said vehicle to propel same.

References Cited by the Examiner

UNITED STATES PATENTS

| | | |
|---|---|---|
| 2,364,676 | 12/44 | Warner. |
| 2,387,627 | 10/45 | Warner _____ 180—7 |
| 2,390,859 | 12/45 | Warner. |
| 2,397,526 | 4/46 | Bonbright _____ 244—13 X |
| 2,656,136 | 10/53 | Martin _____ 244—106 |
| 2,734,701 | 2/56 | Horton. |
| 2,753,135 | 7/56 | Gouge _____ 244—106 |
| 3,070,327 | 12/62 | Dornier _____ 244—12 |

FOREIGN PATENTS

| | | |
|---|---|---|
| 1,238,499 | 7/60 | France. |
| 1,299,579 | 6/62 | France. |

OTHER REFERENCES

"Teknillinen Aikakauslehti," article by Kaario, February 1942 (Finland, pages 43–48 relied on).

Aero Digest Magazine, January 1949, pages 38 and 39.

The Autocar Magazine, August 1959, page 44.

FERGUS S. MIDDLETON, *Primary Examiner.*

RALPH D. BLAKESLEE, *Examiner.*